W. C. CARR.
MOTOR CONTROL APPARATUS.
APPLICATION FILED JULY 23, 1917.
1,322,536.
Patented Nov. 25, 1919.
3 SHEETS—SHEET 1.
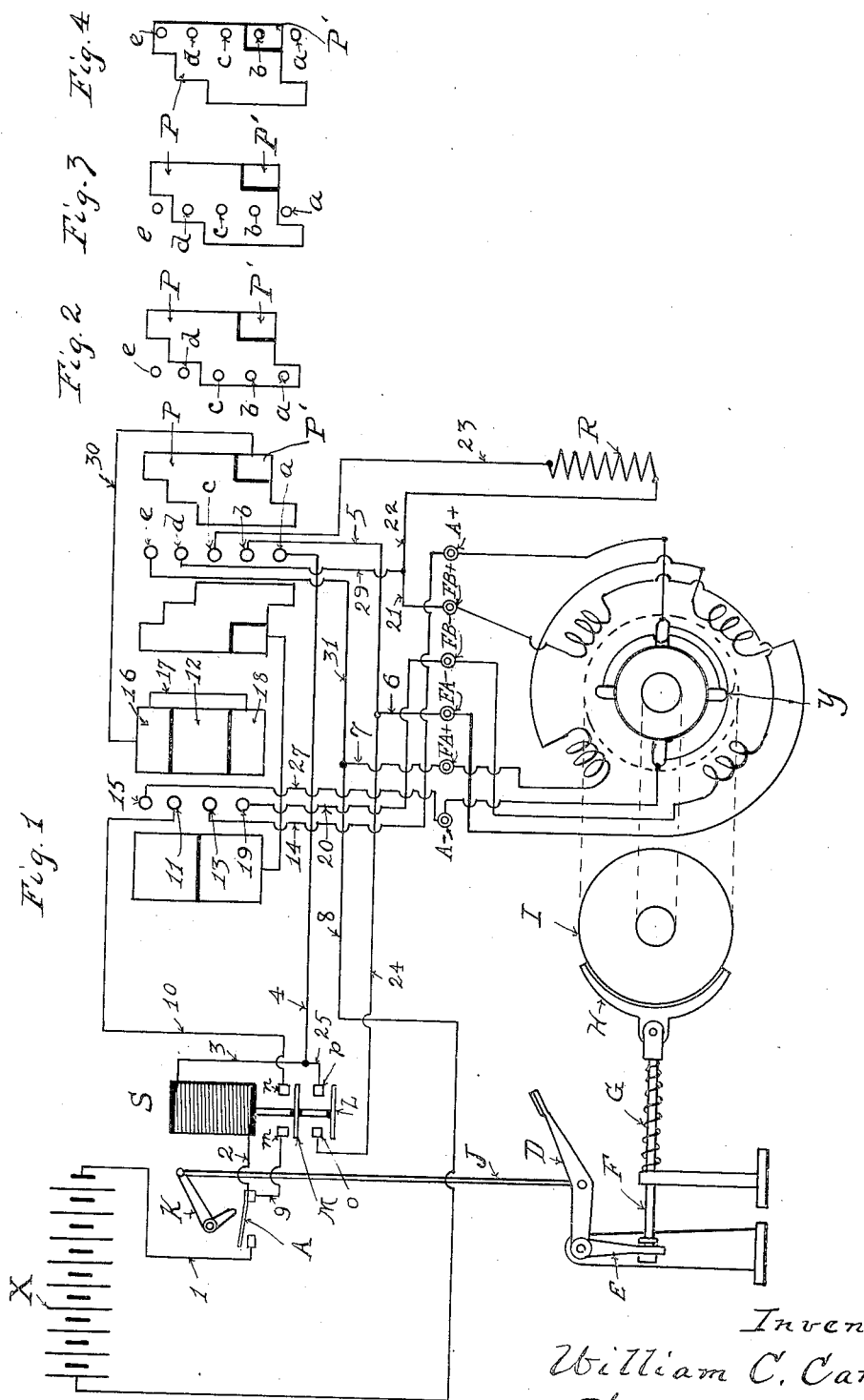
Inventor:
William C. Carr
by Thos M. ...
Atty.

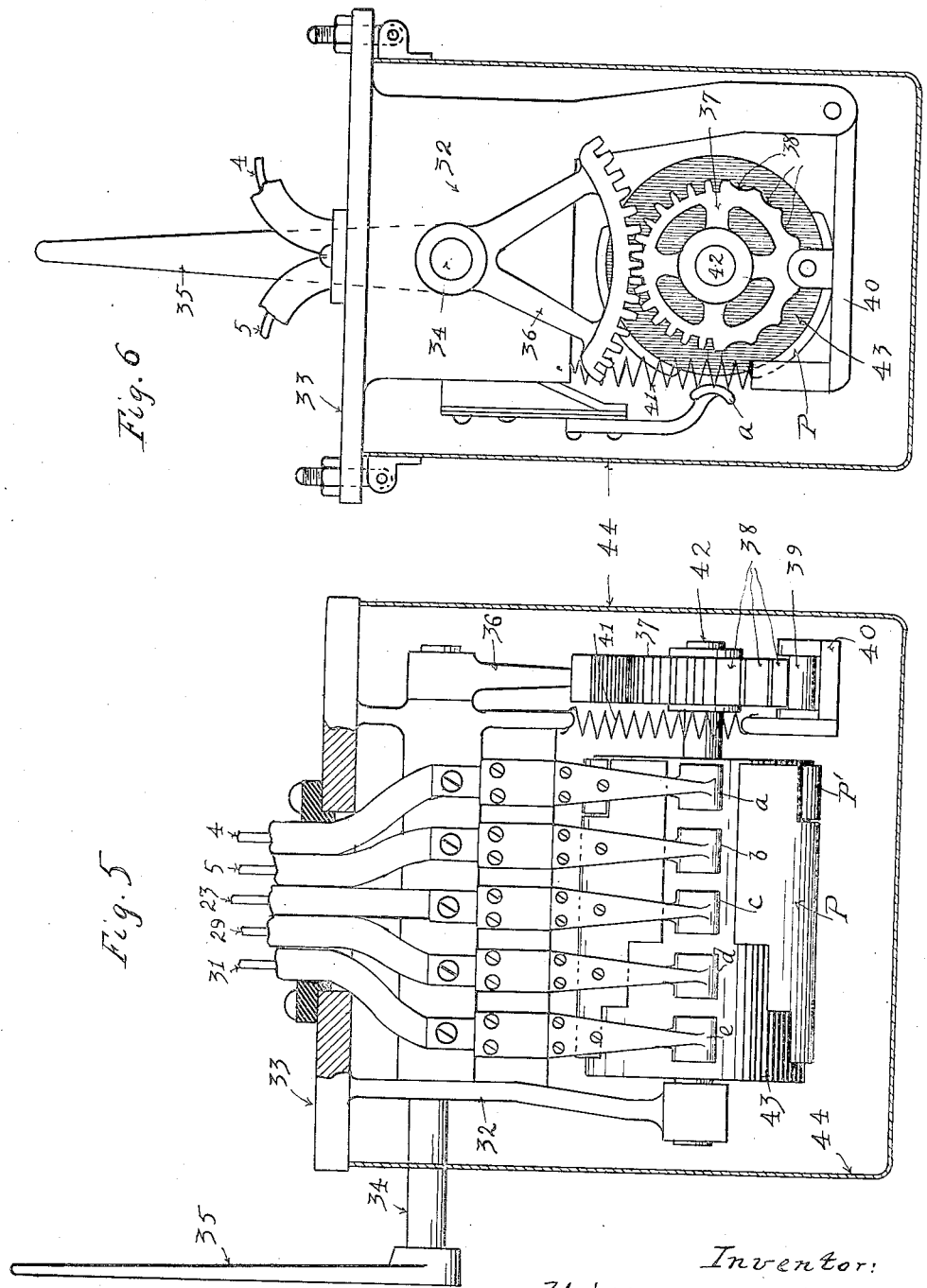

W. C. CARR.
MOTOR CONTROL APPARATUS.
APPLICATION FILED JULY 23, 1917.
1,322,536.
Patented Nov. 25, 1919.
3 SHEETS—SHEET 3.
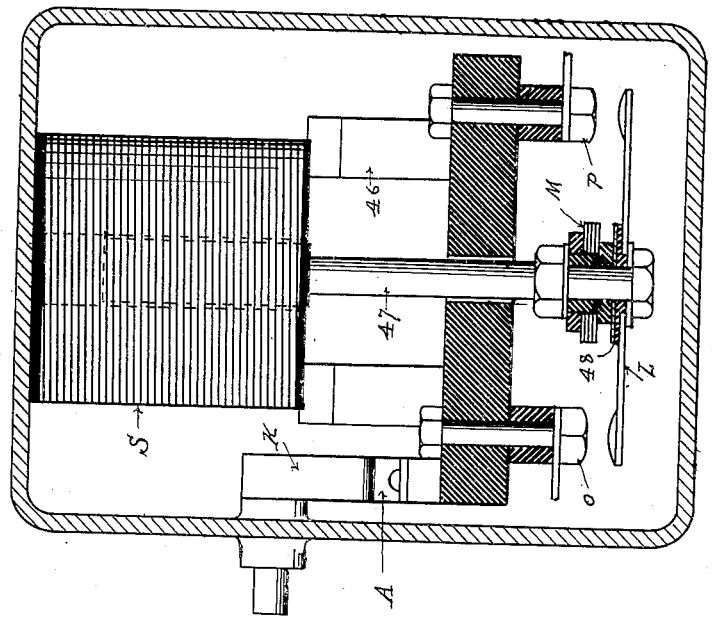
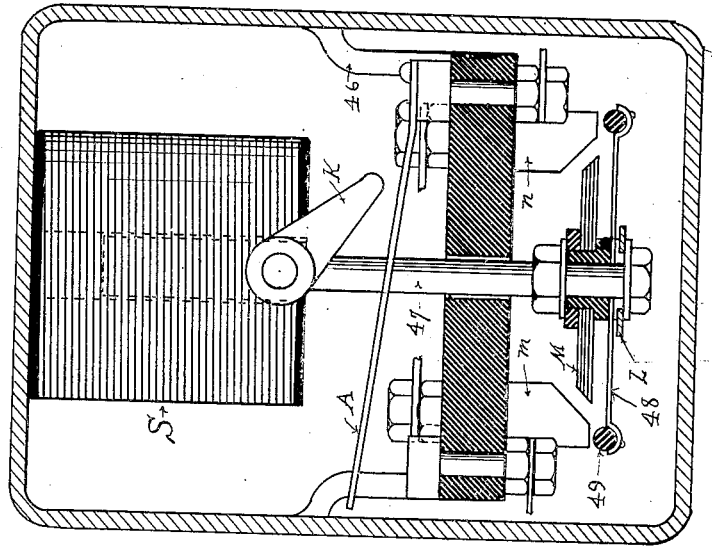
Inventor:
William C. Carr
by H. W. Macomber
Atty.

UNITED STATES PATENT OFFICE.

WILLIAM C. CARR, OF BUFFALO, NEW YORK.

MOTOR-CONTROL APPARATUS.

1,322,536.  Specification of Letters Patent.  Patented Nov. 25, 1919.

Application filed July 23, 1917. Serial No. 182,233.

*To all whom it may concern:*

Be it known that I, WILLIAM C. CARR, a citizen of the United States, residing at Buffalo, in the county of Erie and State of New York, have invented certain new and useful Motor-Control Apparatus, of which the following is a specification.

My invention relates to motor control apparatus, and more particularly motor control apparatus for electric trucks.

In the operation of trucks by electric energy it is practice to provide a plurality of speeds and to provide independent means (preferably in connection with a brake) to open and close the operating circuit. Such construction is shown in my Patent No. 1,185,630, June 6, 1916. Reference to said patent and also my Patent No. 1,129,954, March 2, 1915, renders it unnecessary to illustrate and describe the truck and said mechanism in detail.

The object of my present invention is to improve the speed control apparatus, and especially to provide in connection therewith means for preventing initial application of power upon any speed excepting the lowest, when power has been cut off by opening the switch operated in conjunction with the brake. The tendency of truck operators, when the construction so permits, is to close the switch after a stop upon one of the higher speeds. This results in strain upon the truck mechanism and, when storage battery is employed, injury to the battery. This invention prevents such misuse; and these and other objects will be seen from the following specifications and from the annexed drawings in which—

Figure 1 is a diagrammatic showing of the apparatus.

Figs. 2, 3, and 4 are detail views of the contact plate in its three positions.

Fig. 5 is a side elevation of my controller.

Fig. 6 is an end elevation of the same.

Fig. 7 is a side elevation of my solenoid circuit control.

Fig. 8 is an end elevation of the same.

I will first describe the apparatus in general and trace the several circuits sufficiently to disclose the operation, and then I will describe my improved controller and solenoid.

Referring especially to Figs. 1 to 4, inclusive, Y indicates a motor which takes its energy from a battery X. A represents a cam-switch in the main conductor from the battery and which, as will hereafter be seen, must be closed in order to energize any circuit and the opening of which breaks any established circuit. This cam-switch is operated by a lever K and a rod J, which rod J is pivoted to a treadle D, which has a forked lever engaging a brake rod F, which connects with a brake H and is forced normally into braking action by a spring G. The brake H acts upon a brake drum I which may be upon the motor shaft, but which is preferably upon a member driven by the motor. It will, of course, be understood that this brake and switch operating mechanism may be constructed to operate in reverse manner, that is to say, so that depressing the treadle D will apply the brake and open the switch instead of the reverse operation as described.

S represents a solenoid which, when energized, causes a plate M to make electrical connection with contacts $m$ and $n$, and a plate L to make electrical connection with contacts $o$ and $p$.

P indicates a contact plate capable of making electrical connection with contacts $a$ to $e$ inclusive, and P' indicates a plate capable of making electrical connection with contact $b$ in a certain position. 12, 16, 18 represent plates which make electrical connection with contacts 11, 13, 15, and 19 as hereafter described. These contact plates are mounted upon the drum of my controller, as will be more fully described later, and for the purpose of reversing the rotation of the motor, other similar plates are provided; but these it is unnecessary to describe, since construction for reverse motor action would be evident to any person skilled in the art.

In Fig. 1 the parts are shown in the off position, that is, where the controller has not been moved to starting position, where the motor brake is set, and where the cam-switch controlled in connection therewith is open.

By the first movement of the controller the plate P is rotated so that it makes electrical connection with the contacts $a$, $b$, and $c$, as shown in Fig. 2. At the same time plate 16 makes electrical connection with control 15, plate 12 with contacts 11 and 13, and plate 18 with contact 19. These electrical connections are common to all speeds. Since no circuit can be energized under any circumstances until the cam-switch A is closed, the operator now presses down on the pedal D, forcing the forked lever E outwardly and forcing the brake-rod F against the spring G and thereby releasing the brake H from the drum I. This operation also draws down the rod J, swings the bell-crank lever K, and its cam end forces the switch A into position of electrical connection.

This establishes a circuit for energizing the solenoid S as follows:

From battery through wire 1, switch A, wire 2, coil of solenoid S, wires 3, 4, contact $a$, plate P, contact $b$, wires 5, 6, binding-post FA minus through coils to binding-post FA plus, and wires 7 and 8 to battery X.

This energizes the solenoid S so that the plate M makes electrical connection with the contacts $m$ and $n$, and the plate L makes electrical connection with the contacts $o$ and $p$. This establishes the following circuit from battery:

Wire 1, switch A, wire 9, contact $m$, plate M, contact $n$, wire 10, contact 11, plate 12, contact 13, wire 14, binding-post A plus, motor armature, binding-post A minus, wire 27, contact 15, plate 16, connecting wire 17, plate 18, contact 19, wire 20, binding-post FB minus, motor coils, binding-post FB plus, wires 21, 22, resistance R, wire 23, contact $c$, plate P, contact $b$, wires 5, 6, binding-post FA minus, coils, binding-post FA plus and wires 7 and 8 to battery. This energizes the motor upon its lowest or starting speed. Let it now be assumed that it is desired to increase the speed. The operator moves the controller to bring the plate P into the position shown in Fig. 3, in which electrical connection is made with contacts $b$, $c$, and $d$. This movement does not deënergize the solenoid S, but establishes the following holding circuit:

From battery through wire 1, switch A, wire 2, coils or solenoid S, wire 3 and 25, contact P, plate L, contact $o$, wires 24, 6, binding-post FA minus, coils, binding-post FA plus, and wires 7 and 8 to battery.

The motor circuit in this position is: wire 1, switch A, wire 9, contact $m$, plate M, contact $n$, wire 10, contact 11, plate 12, contact 13, wire 14, binding-post A plus, armature, binding-post A minus, wire 27, contact 15, plate 16, connecting-wire 17, plate 18, contact 19, wire 20, binding-post FB minus, coils, binding-post FB plus, wires 21, 29, contact $d$, plate P, contact $b$, wires 5, 6, binding-post FA minus, coils, binding-post FA plus and wires 7 and 8 to battery.

This applies more energy; and let it be assumed that, for some reason, the operator while employing this position of the controller, releases the treadle D, thus applying the brake H and opening the switch A and coming to a stop. This, of course, deënergizes the solenoid S and opens both the circuits capable of being established by it. And again suppose that, having so done, the operator attempts to start the truck on this second speed position by depressing the treadle, releasing the brake and closing the switch A. No action will follow, because the plate P having been moved so that it is out of electrical connection with the contact $a$, no energizing circuit can be established for the solenoid S. The operator must first move his controller to the first speed position; and as will presently appear, he is in like manner barred from an attempt to start his motor on the higher speed.

Assuming now that the motor is running on the second speed as just described and that the operator desires to apply the maximum speed. He moves the plate P to the position of Fig. 4. In this position the circuit which holds the solenoid S energized is as follows:

From battery through wire 1, switch A, wire 2, coil of solenoid S, wire 3, 25, contact $p$, plate L, contact $o$, wires 24, 5, contact $b$, plate P', wire 30, plate 16, wire 17, plate 18, contact 19, wire 20, binding-post FB minus, coils, binding-post FB plus, wires 21, 29, contact $d$, plate P, contact $e$, and wires 31 and 8 to battery.

The operating current is from battery through wire 1, switch A, wire 9, contact $m$, plate M, contact $n$, wire 10, contact 11, plate 12, contact 13, wire 14, binding-post A plus, armature, binding-post A minus, wire 27, contact 15, plate 16; and from plate 16 the current splits, part going from said plate 16 to wire 17, plate 18, contact 19, wire 20, binding-post FB minus, coils, binding-post FB plus, wire 21, wire 29, contact $d$, plate P, contact $e$, and wires 31 and 8 to battery; while the other part of the current goes from said plate 16 through wire 30, plate P', contact $b$, wires 5 and 6, binding-post FA minus, coils, binding-post FA plus, and wires 7 and 8 to battery.

Referring now to Figs. 5 and 6, showing my improved controller, journaled in a yoke 32 on the cap 33 is a shaft 34, which has upon its outer end a hand lever 35, by which it is rotated. Upon the other end is a gear segment 36. In mesh with this segment is a pinion 37, the upper half of which is toothed to so mesh, and the lower half of which is recessed or concaved as at 38, which concavities receive and seat a roller 39 which is pivoted medially in an arm 40. At one end this arm 40 is pivoted to an extension on the yoke 32 and the free end is engaged by a retraction spring 41. The pinion 37 is rigidly mounted upon a shaft 42 which is journaled in the yoke 32, and a drum 43, of dielectric material is also rigidly mounted upon said shaft 42. Mounted upon this drum 43 are the plates P and P' and the corresponding plates for reverse motor action.

Mounted within said yoke and insulated thereupon are the contacts $a$, $b$, $c$, $d$, and $e$ and from these contacts lead the conductors 4, 5, 23, 29 and 31.

It will now be seen that, for example, if the controller lever is moved to the left (in Fig. 6) the segment 36 will rotate the pinion 37, so that the arm 40 will be depressed and the plate P will come into electrical connection with the contacts $a$, $b$, and $c$. And when such movement is made the roller 39 on the arm 40 will seat in the corresponding depression 38 in the pinion 37 and the spring action will tend to hold the drum in that position. In this movement the drum is held for all positions; and it will be understood that the plates 16, 12, and 18, and the corresponding reversing plates, are also mounted upon this drum (but not shown in Fig. 6), and are brought into electrical connection with the contacts 15, 11, 13 and 19 by these movements of the drum. The entire apparatus is preferably inclosed in an oil-containing casing 44.

Referring now to Figs. 7 and 8, the solenoid S, the switch A, the plate M, capable of making electrical connections with the contacts $m$ and $n$, and the plate L, capable of making electrical connection with the contacts $o$ and $p$, are there shown. These are all inclosed in an oil-containing casing 45. The switch A, with its contact, and the contacts $m$, $n$, $o$, and $p$, are all supported upon an insulating plate, which is supported upon brackets 46, carried by said casing. The cam K is journaled in a bearing in said casing, and acts upon the switch A. The plates M and L are mounted upon, but insulated from the stem 47 of the core piece of said solenoid; and to insure the breaking of the circuits established by the plates M and L when the solenoid is deënergized, there is mounted upon but insulated from said stem, a spring plate 48, which carries upon its free ends insulating pieces 49, which bear against the contacts $m$ and $n$ when the solenoid is energized, and the contact plates are brought to the closed position. Since the plate M carries the larger volume of current, it is preferably laminated, as shown, and makes substantially a brush contact. The plate L is preferably a more resilient plate, and as it carries a lesser amount of current, is preferably so adjusted as to break circuit after the plate M has moved from contact position, thus reducing the tendency to spark materially.

From the foregoing description, it will be seen that I provide a simple and effective control for the motor, so arranged that it is not possible for the operator to start the motor except upon the lowest speed, and by the special arrangement of my solenoid energizing and holding circuits, such control is maintained at all times, and the change of speed effected without the use of resistance coils other than the resistance coil employed in connection with the lowest speed.

Having thus described my invention, I claim:

1. In a motor control of the type described, in combination with a motor and a source of electric energy, a controller, a solenoid for establishing the operating circuits for said motor upon a plurality of speeds, an independent switch for opening and closing all circuits, a circuit for energizing said solenoid when said controller is moved to the lowest speed position and said independent switch is closed, a low speed operating circuit established by the closing of said solenoid when said controller is in said lowest speed position, a circuit for holding said solenoid energized when said controller is moved to a higher speed position, and a circuit established by said controller for applying energy to said motor, and means including contacts carried by said controller for disestablishing said energizing circuit when said controller is moved to a higher speed position, whereby, if said independent switch is opened with said controller in such higher speed position and said solenoid deënergized, said solenoid can not be reënergized, except by returning said controller to its lowest speed position, a brake operatively connected to said independent switch, and means whereby when said independent switch is opened, said brake is applied to stop the mechanism.

2. In a motor control of the type described, in combination with a motor and a source of electric energy, a controller, a solenoid, circuit closing means on said controller for establishing a circuit to energize said solenoid and for establishing circuits for operating said motor upon a plurality of speeds, circuit closing means on said solenoid for establishing said motor operating circuits and circuit closing means on said solenoid for maintaining the energized condition of said solenoid when said controller is set for a speed higher than the initial speed, an independent switch for opening and closing all circuits and a brake operatively connected with said independent switch for stopping the motor and mechanism, and means on said controller for breaking the solenoid energizing circuit whenever said controller is moved to a speed higher than the initial speed, whereby if said independent switch be closed and said brake thrown out of action, after the same has been opened while the controller is set at a speed higher than the lowest speed, a motor circuit can be reestablished only by returning said controller to its lowest speed.

WILLIAM C. CARR,